US009824163B2

(12) United States Patent
Mostafa et al.

(10) Patent No.: US 9,824,163 B2
(45) Date of Patent: Nov. 21, 2017

(54) METHOD AND APPARATUS FOR PROVIDING A SEARCH TOOL IN CONNECTION WITH ADDRESS MANAGEMENT

(75) Inventors: Miraj Mostafa, Tampere (FI); Thinh Nguyenphu, Southlake, TX (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/031,447

(22) Filed: Feb. 21, 2011

(65) Prior Publication Data

US 2011/0208772 A1 Aug. 25, 2011

Related U.S. Application Data

(60) Provisional application No. 61/306,626, filed on Feb. 22, 2010.

(51) Int. Cl.
*G06F 17/30* (2006.01)
*G06Q 30/02* (2012.01)

(52) U.S. Cl.
CPC .. *G06F 17/30997* (2013.01); *G06F 17/30864* (2013.01); *G06Q 30/02* (2013.01)

(58) Field of Classification Search
None
See application file for complete search history.

(56) References Cited

U.S. PATENT DOCUMENTS

| 7,454,459 | B1* | 11/2008 | Kapoor et al. | 709/203 |
| 8,601,022 | B2* | 12/2013 | Gropper | 707/770 |
| 2001/0002469 | A1* | 5/2001 | Bates | G06F 17/30699 |
| 2004/0024846 | A1* | 2/2004 | Randall | H04L 67/04 709/219 |
| 2004/0249846 | A1* | 12/2004 | Randall | H04M 1/576 |
| 2006/0085419 | A1* | 4/2006 | Rosen | G06F 17/3087 |
| 2006/0195474 | A1* | 8/2006 | Cadiz et al. | 707/104.1 |
| 2006/0229063 | A1 | 10/2006 | Koch | |
| 2008/0133677 | A1 | 6/2008 | Pattabhiraman et al. | |
| 2008/0189292 | A1* | 8/2008 | Stremel et al. | 707/10 |
| 2009/0150488 | A1* | 6/2009 | Martin-Cocher et al. | 709/204 |
| 2009/0299985 | A1* | 12/2009 | Boberg | G06Q 10/10 |
| 2010/0083125 | A1* | 4/2010 | Zafar et al. | 715/739 |

(Continued)

FOREIGN PATENT DOCUMENTS

WO WO 2008/111081 A2 9/2008
WO WO 2010/018455 A1 2/2010

OTHER PUBLICATIONS

International Search Report and Written Opinion, received in corresponding Patent Cooperation Treaty Application No. PCTIB2011/050709 dated Jun. 1, 2011. 11 pages.

(Continued)

*Primary Examiner* — Albert Phillips, III
*Assistant Examiner* — Raheem Hoffler
(74) *Attorney, Agent, or Firm* — Alston & Bird LLP

(57) ABSTRACT

A method for providing a search tool for use in connection with address book management may include receiving an indication of an address book update event associated with a contact of an address book of a user, causing performance, via a processor, of a search responsive to receipt of the indication, and enabling modification of contact information associated with the contact based on the search results. A corresponding apparatus and computer program product are also provided.

19 Claims, 5 Drawing Sheets

(56) References Cited

U.S. PATENT DOCUMENTS

| | | | | |
|---|---|---|---|---|
| 2010/0088430 A1* | 4/2010 | Ton et al. | | 709/248 |
| 2010/0153459 A1* | 6/2010 | Sousa et al. | | 707/797 |
| 2010/0153528 A1* | 6/2010 | Pearson et al. | | 709/223 |
| 2010/0211634 A1* | 8/2010 | Song et al. | | 709/203 |
| 2010/0238919 A1* | 9/2010 | Froelich | H04L 12/581 | 370/352 |
| 2011/0093933 A1* | 4/2011 | Lindholm | H04L 63/107 | 726/5 |
| 2011/0099211 A1* | 4/2011 | Hyatt et al. | | 707/812 |
| 2011/0201329 A1* | 8/2011 | Carter | | 455/432.1 |
| 2011/0238673 A1* | 9/2011 | Carter et al. | | 707/748 |
| 2014/0304260 A1* | 10/2014 | Ulm | G06F 17/30 | 707/728 |

OTHER PUBLICATIONS

Office Action from Canadian Patent Application No. 2,790,534, dated Aug. 14, 2014.
Office Action for corresponding Canadian Application No. 2,790,534 dated Jun. 29, 2015.
Extended European Search Report from European Application No. 11744347.3 dated May 7, 2015.
Office Action from corresponding Canadian Application No. 2,790,534, dated Jul. 4, 2016, 7 pages.
Office Action from Canadian Patent Applicatin No. 2,790,534, dated May 11, 2017, 4 pages.

* cited by examiner

METHOD AND APPARATUS FOR PROVIDING A SEARCH TOOL IN CONNECTION WITH ADDRESS MANAGEMENT

RELATED APPLICATION

This application claims the benefit of U.S. Provisional Application No. 61/306,626, filed Feb. 22, 2010, the contents of which are incorporated herein in their entirety.

TECHNOLOGICAL FIELD

Embodiments of the present invention relate generally to electronic device technology and, more particularly, relate to a method and apparatus for providing a search tool for use in connection with address book management.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

As mobile electronic devices become more and more ubiquitous, it is increasingly common for people to integrate such devices into their social lives.

Communications with friends and even meeting new friends can often be facilitated using mobile terminals. In this regard, there have been numerous Internet based and other services directed at integrating communication and socialization via mobile terminals. For example, certain applications such as texting, blogs, photoblogs, social bookmarking, podcasts, and numerous others, enable the sharing of information or expression between users of mobile electronic devices. Such applications often provide the ability to share information based on contact information (e.g., a phone number, email address or other address information) and/or status/interest maintained by users. However, when populating an address book with a new contact entry or contact information of an existing contact entry, a user may not be aware of the full scope of the contact information for a particular contact entry. For example, two users may only share a mobile number and remaining portions of the contact information (e.g., phone number, e-mail address, street address, alternate address information, employment information, etc.) for each respective user may not be filled in when corresponding new contact entries are created. Users also may not have the time or think to update contact information until a later time arises when such information would be desirable to have immediately at hand. Moreover, when a user inserts contact information in her address book, there could be a mistake (e.g., spelling mistake, false information, address formatting issue) there.

Accordingly, it may be desirable to provide a mechanism by which at least some of the issues discussed above may be addressed.

BRIEF SUMMARY

A method, apparatus and computer program product are therefore provided for enabling the provision of a search tool for use in connection with address book management. Accordingly, for example, an automatic search may be conducted (depending on setting/preferences/configuration) responsive to a particular event in order to locate potential update information for a particular contact. The user may then be made aware of such information and select whether or not to adopt the located new information, or the information may automatically be updated depending upon user preferences or settings. The update information obtained from search result may also be used for other address book management services/features, like subscription-based continuous automatic update of the address book and, user-notification for the status update of the contact entry. The search operation might be further configured (e.g., progressive search to reduce the number of search databases, conditional search requiring key information in the query) to reduce resource requirement, depending on the need.

In an example embodiment, a method for providing a search tool for use in connection with address book management is provided. The method may include receiving an indication of an address book update event associated with a contact of an address book of a user, causing performance, via a processor, of a search responsive to receipt of the indication, and enabling modification of contact information associated with the contact based on the search results.

In an example embodiment, a computer program product for providing a search tool for use in connection with address book management is provided. The computer program product includes at least one non-transitory computer-readable storage medium having computer-executable program code instructions stored therein. The computer-executable program code instructions may include program code instructions for receiving an indication of an address book update event associated with a contact of an address book of a user, causing performance, via a processor, of a search responsive to receipt of the indication, and enabling modification of contact information associated with the contact based on the search results.

In an example embodiment, an apparatus for providing a search tool for use in connection with address book management is provided. The apparatus may include at least one processor and at least one memory including computer program code. The at least one memory and the computer program code may be configured to, with the at least one processor, cause the apparatus to at least perform receiving an indication of an address book update event associated with a contact of an address book of a user, causing performance, via a processor, of a search responsive to receipt of the indication, and enabling modification of contact information associated with the contact based on the search results.

In an example embodiment, an apparatus for providing a search tool for use in connection with address book management is provided. The apparatus may include means for receiving an indication of an address book update event associated with a contact of an address book of a user, means for causing performance of a search responsive to receipt of the indication, and means for enabling modification of contact information associated with the contact based on the search results.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
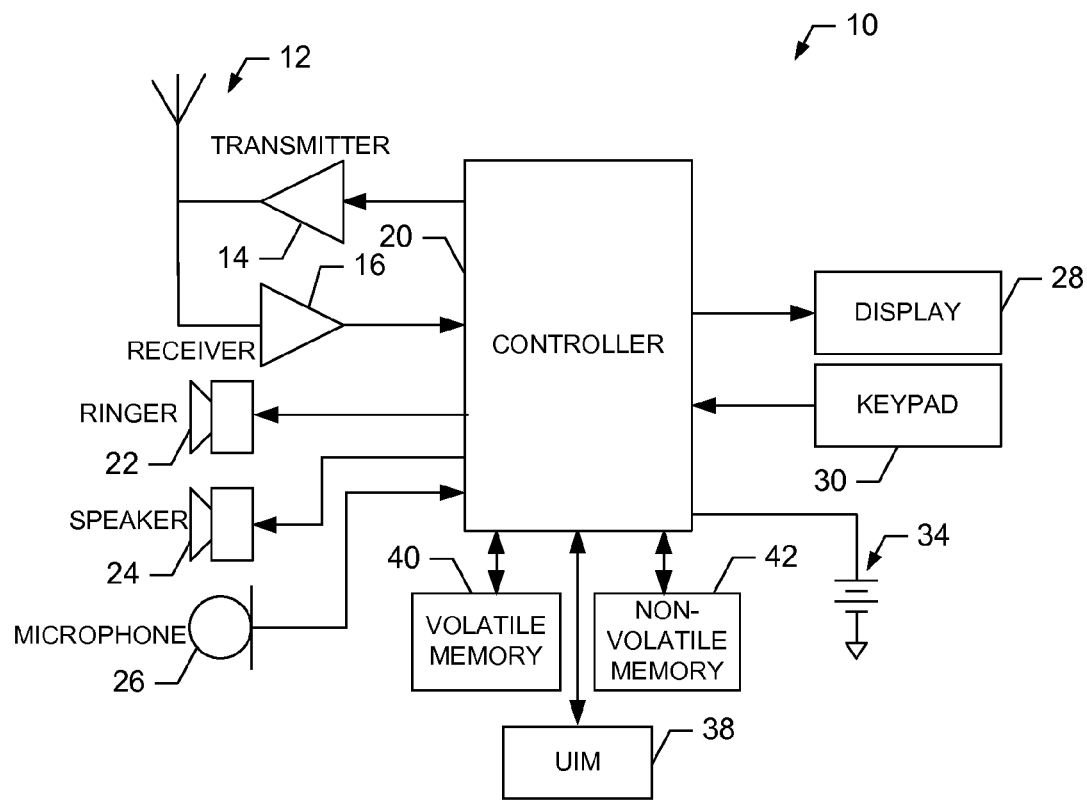
FIG. 1 is a schematic block diagram of a mobile terminal according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, some embodiments of the present invention may provide a search tool that may operate responsive to a particular event associated with address book updating (e.g., in response to addition of a new contact, editing of a contact, etc.). Accordingly, some embodiments may provide for a mechanism by which the address book (e.g., a phonebook, contact list, group, or other listings of entity identifiers with corresponding information associated with a method by which each entity identified may be contacted) may be automatically updated.

Of note, the Open Mobile Alliance (OMA) has been working on development and standardization of a network-based address books (NAB) system in terms of Converged Address Book (CAB). The CAB is intended to serve as a common launching platform for services dependent on contact and/or status information. A notification service has been proposed for CAB by which subscribers to the service may be informed about the status of the contacts in their address book (e.g., when contacts of their respective address books become users of CAB). Another service within the scope of CAB is, when another member updates the member's own contact information, the particular service member may receive the update continuously. This continuous update can be achieved by subscribing the contact and status information of the member maintained by herself. However, if CAB requires the sharing of significant and/or critical (e.g., trading) information between operators for the above-mentioned service, it is not necessarily desirable from the perspective of the operators and it also requires a relatively large pool of available resources. Some embodiments of the present invention may be used instead of CAB services or even may operate in parallel with CAB or similar services or may use information made available via CAB or similar services. Moreover, embodiments of the present invention may operate from either a service platform in the form of a server or other network device, or from a platform directly associated with a user (e.g., a mobile terminal or even a fixed electronic communication device having access to address book services such as a laptop or personal computer (PC).

FIG. 1, one example of a device that may benefit from implementation of an exemplary embodiment of the invention, illustrates a block diagram of a mobile terminal 10. It should be understood, however, that a mobile terminal as illustrated and hereinafter described is merely illustrative of one type of device that may benefit from embodiments of the present invention and, therefore, should not be taken to limit the scope of embodiments of the present invention. Several different embodiments of the mobile terminal 10, such as portable digital assistants (PDAs), pagers, mobile telephones, mobile televisions, gaming devices, all types of computers (e.g., laptops or mobile computers), cameras, audio/video players, radio, global positioning system (GPS) devices, or any combination of the aforementioned, and other types of communications devices, may readily employ embodiments of the present invention. Additionally, as indicated above, non-mobile devices such as laptops or PCs may also implement embodiments of the present invention.

The mobile terminal 10 may include an antenna 12 (or multiple antennas) in operable communication with a transmitter 14 and a receiver 16. The mobile terminal 10 may further include an apparatus, such as a controller 20 or other processor, which provides signals to and receives signals from the transmitter 14 and receiver 16, respectively. The signals may include signaling information in accordance with the air interface standard of the applicable cellular system, and/or may also include data corresponding to user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

It is understood that the controller 20 may include circuitry implementing, among others, audio and logic functions of the mobile terminal 10. For example, the controller 20 may comprise a digital signal processor device, a microprocessor device (e.g., processor 70 of FIG. 3), and various analog to digital converters, digital to analog converters, and/or other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a ringer 22, a microphone 26, a display 28, and a user input interface, which may be coupled to the controller 20. The user input interface, which allows the mobile terminal 10 to receive data, may include any of a number of devices allowing the mobile terminal 10 to receive data, such as a keypad 30, a touch display (not shown), a microphone or other input device. In embodiments including the keypad 30, the keypad 30 may include numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

The mobile terminal 10 may further include a user identity module (UIM) 38, which may generically be referred to as a smart card. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), or any other smart card. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 may additionally or alternatively comprise an electrically erasable programmable read only memory (EEPROM), flash memory or the like. The memories may store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10.

Figure 2:
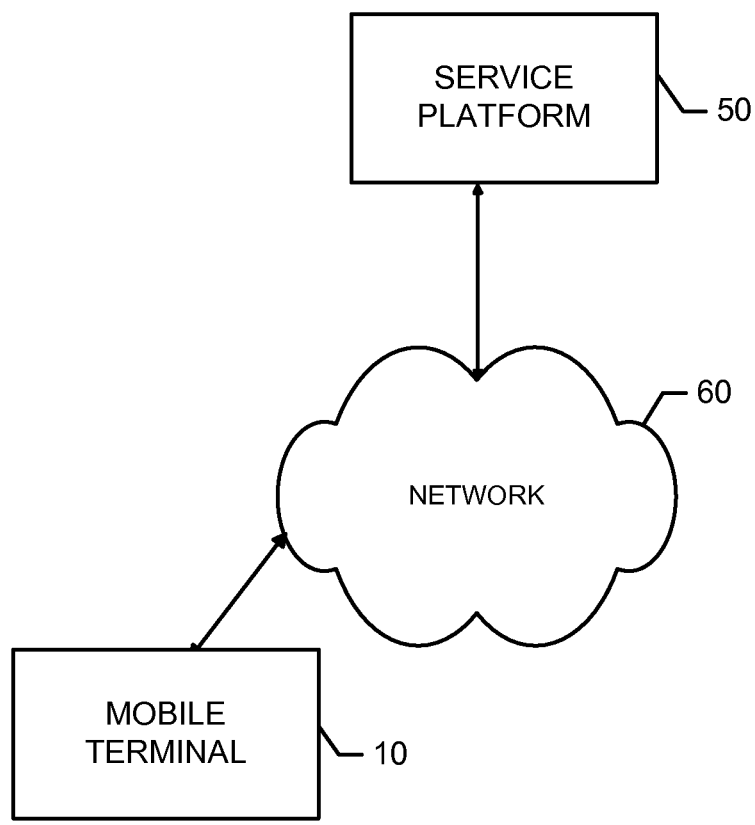
FIG. 2 illustrates a system according to an exemplary embodiment of the present invention.

FIG. 2 illustrates a generic system diagram in which a device such as the mobile terminal 10, which may benefit from embodiments of the present invention, is shown in an exemplary communication environment. In this regard, the mobile terminal 10 may be configured to include an apparatus for employing a search tool for use in address book management in accordance with an example embodiment. As shown in FIG. 2, an embodiment of a system in accordance with an example embodiment of the present invention may include a first communication device (e.g., mobile terminal 10) and a service platform 50 capable of communication with each other via a network 60. In some cases, embodiments of the present invention may further include one or more network devices or other mobile or fixed communication devices with which the mobile terminal 10 and/or the service platform 50 may communicate to provide, request and/or receive information. The network devices may include, for example, one or more servers, base stations, access points, gateways, communication controllers or other computers configured to perform various functions. In some cases, embodiments of the present invention may also or alternatively be practiced on one or more of the network devices and/or the communication devices that communicate with each other and/or the network devices.

In an example embodiment, the service platform 50 may be a device or node such as a server or other processing circuitry. The service platform 50 may have any number of functions or associations with various services. As such, for example, the service platform 50 may be a platform such as a dedicated server, backend server, or server bank associated with a particular information source, function or service. As such, the service platform 50 may represent one or more of a plurality of different services or information sources. The functionality of the service platform 50 may be provided by hardware and/or software components configured to operate in accordance with known techniques for the provision of information to users of communication devices, except as modified as described herein.

In an exemplary embodiment, the service platform 50 may provide, among other things, address book management services via the address book manager apparatus described in greater detail below. In such cases, the service platform 50 may work together with the mobile terminal 10 (e.g., in a server/client relationship) to provide address book management services as described herein. However, in some embodiments, the mobile terminal 10 itself may practice address book management without any need for assistance from the service platform 50.

The network 60 may include a collection of various different nodes, devices or functions that may be in communication with each other via corresponding wired and/or wireless interfaces. As such, the illustration of FIG. 2 should be understood to be an example of a broad view of certain elements of the system and not an all inclusive or detailed view of the system or the network 60. One or more communication terminals such as the mobile terminal 10 and the service platform 50 may be in communication with each other via the network 60 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices (e.g., personal computers, server computers or the like) may be coupled to the mobile terminal 10 and/or the service platform 50 via the network 60. By directly or indirectly connecting the mobile terminal 10 and/or the service platform 50 and other devices to the network 60 or to each other, the mobile terminal 10 and/or the service platform 50 may be enabled to communicate with the other devices or each other, for example, according to numerous communication protocols to thereby carry out various communication or other functions of the mobile terminal 10 and/or the service platform 50, respectively.

Furthermore, although not specifically shown in FIG. 2, the mobile terminal 10 may communicate with other devices in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 and the service platform 50 may be enabled to communicate with the network 60 and each other by any of numerous different access mechanisms. For example, mobile access mechanisms such as wideband code division multiple access (W-CDMA), CDMA2000, global system for mobile communications (GSM), long term evolution (LTE), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

An exemplary embodiment of the invention will now be described with reference to FIG. 3, in which certain elements of an apparatus for enabling the provision of a search tool for address book management are displayed. The apparatus of FIG. 3 may be employed, for example, on the mobile terminal 10 of FIG. 1. However, it should be noted that the apparatus of FIG. 3, may also be employed on a variety of other devices, both mobile and fixed (e.g., computers or servers), and therefore, embodiments of the present invention should not be limited to application on devices such as the mobile terminal 10 of FIG. 1. Alternatively, embodiments may be employed on a combination of devices including, for example, those listed above. Accordingly, embodiments of the present invention may be embodied wholly at a single device (e.g., the mobile terminal 10) or by devices in a client/server relationship. Furthermore, it should be noted that the devices or elements described below may not be mandatory and thus some may be omitted in certain embodiments.

Figure 3:
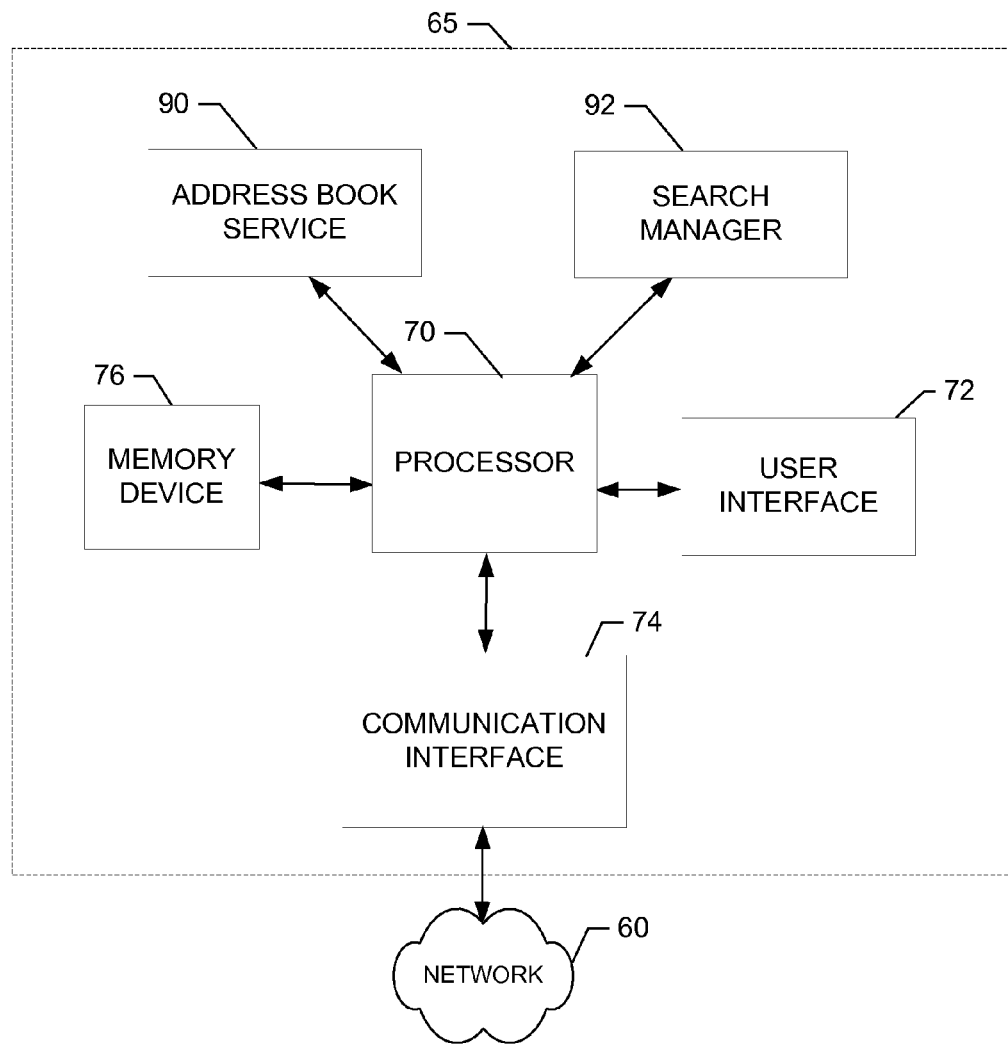
FIG. 3 is a schematic block diagram of an apparatus for providing a search tool for use in connection with address book management according to an exemplary embodiment of the present invention.

Referring now to FIG. 3, an apparatus 65 for enabling the provision of a search tool for address book management is provided. In some embodiments, the apparatus 65 is embodied at the mobile terminal 10, while in other embodiments the apparatus 65 is embodied at the service platform 50 or in distributed fashion between the mobile terminal 10 and the service platform 50. The apparatus 65 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., the mobile terminal 10 or a network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device (e.g., the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an exemplary embodiment, the processor 70 may be embodied as, include or otherwise control an address book service 90 and a search manager 92. As such, in some embodiments, the processor 70 may be said to cause, direct or control the execution or occurrence of the various functions attributed to the address book service 90 and the search manager 92 as described herein. The address book service 90 and the search manager 92 may each be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the address book service 90 and the search manager 92, respectively, as described herein. Thus, in examples in which software is employed, a device or circuitry (e.g., the processor 70 in one example) executing the software forms the structure associated with such means.

The address book service 90 may be configured to enable a user to manage, edit, view, etc. contact information regarding various contacts such as friends, acquaintances, or associates of the user of the apparatus 65. The contact information may define an address book and be associated with a corresponding executable application for delivering the functionality described above. In an example embodiment, the address book service 90 may include a registry. The registry may be defined at any storage device, such as a database, for use in mapping an identifier of a particular contact or entity to corresponding contact information or social services associated with the particular contact. For example, the registry may store mappings of identifiers such as names, nicknames, or other monikers for specific entities to contact information such as, for example, telephone numbers, Mobile Station Integrated Services Digital Network (MSISDN) numbers, email addresses, street addresses, web pages and/or the like. As such, the registry may include a plurality of registry entries. Each registry entry may be generated by the address book service 90 in response to the explicit definition of a particular contact by addition or importation of an identifier and corresponding contact information. The registry may therefore define a contact list with corresponding information indicating methods by which each respective contact may be contacted. As such, the term contact list or address book, as used herein, refers to any listing of contacts having associated contact information including any phonebook, address book, or other collection of information related to specific users, devices, etc. For example, the contact list could be a listing of contacts from Microsoft Outlook or any similar application as is well known in the art.

As indicated above, the address book service 90 may be utilized to add, edit, delete, etc. contact information associated with the contacts defined in the registry. Furthermore, new contacts may be added, existing contacts may be deleted, or contacts may be edited. In the context of the example embodiments, the activities described above may generally be referred to as address book update events. As such, address book update events include, for example, adding, editing or deleting contact information for a contact and/or adding, editing or deleting contacts themselves. In an example embodiment, the address book service 90 may provide an indication to the search manager 92 in response to each address book update event. As an alternative, the search manager 92 may monitor activity of the address book service to determine whether an address book update event has occurred. In either case, the search manager 92 may then receive an indication of an address book update event. Alternatively, the search manager 92 may be in the network under the service platform 50. In this case, the master copy of an address book is stored in the network under the service platform 50, and whenever there is any update made in the address book in a client, the change is automatically propagated in the master copy of the address book in the network, and the search manager 92 monitors the address book update event in the master copy in the network. As such automated searching service might be subject to charging and/or user interest, invoking the search manager 92 in response to an address book update event may also depend on if it is enabled (depending on e.g., user setting, device configuration, and/or service provider preferences). In case the search manager 92 belongs to the network, such enabling setting can be stored and maintained in the network-based user preferences database. In case, the search manager 92 is in the device (e.g., the mobile terminal 10), the enabling setting may be a local setting.

In some embodiments, a predefined subset of the activities described above may be considered to be an address book update event. In this regard, for example, in some cases only enhancing updates may be considered as address book update events. In other words, only updates that expand or are aimed at expanding the contents of the address book or increasing the accuracy of existing contents may be considered to be address book update events. Accordingly, for example, deletions of information and/or deletions of contacts may, in some embodiments, not qualify as address book update events.

In situations in which the apparatus 65 is embodied at the mobile terminal 10, the indication may be received locally (e.g., at the same device at which the address book update event is initiated). However, in situations in which the apparatus 65 is embodied at the service platform 50, the indication may be received remotely (e.g., from a remote device at which the address book update event is initiated.

The search manager 92 may be configured to receive the indication of the address book update event and perform a search responsive to receipt of the indication. In an example embodiment, the search manager 92 may include a search engine configured to receive a query or search term identification and search various accessible sources (e.g., databases, websites or other locations and devices accessible via the network 60) for information associated with the query or search term identified. In an example embodiment, a portion of the contact information associated with a contact from the address book service (e.g., an identifier from the registry, or perhaps a phone number, social network user ID, email, etc.) may be used as the query or search term. For example, if a contact is initially defined only by a name and phone number, the name and/or the phone number may be used as the query or search term. Thus, if a database or website that is accessible via the network 60 includes information regarding further contact information associated with the query or search term, such further contact information may be presented to the user of the apparatus 65 or automatically associated with the corresponding contact. Another aspect of configuring the search manager 92 may be a progressive search, so that critical databases are searched first. If the result from a preliminary search is not satisfactory, the search manager 92 may be configured to search other databases. The database for the preliminary search might be pre-configured or dynamically decided based on a search query and stored information of different databases. As for example, if the search query is a phone number, the country code or area code of the number can be used to find the database of the country or area for preliminary searching. The domain name of an e-mail address or SIP URI can also be used in this regard. This progressive search may minimize the resource required for each search. Moreover, it might also be configured that, the search query requires critical information (e.g., name and at least one communication address, like phone number, e-mail address, or SIP URI) to invoke a search operation. This way, the number of matches in the search result may be minimized, and the required resource may also be optimized.

In some embodiments, an address book update event associated with a particular contact may trigger a search associated with the corresponding contact. However, in some embodiments, dependent upon user preferences, factory settings or other user programmable settings, the search manager 92 may conduct multiple searches for other (or perhaps all) contacts in response to an address book update event indication associated with just one contact or associated with a threshold number of contacts within a given period of time. Alternatively, the user may initiate a search for updates involving one or more contacts by selecting a menu item corresponding to the desired functionality.

In an example embodiment, the search manager 92 is configured to perform a global search using the query or search term defined, and provide the search results to the user. The user may then review the search results and decide whether to add or replace any additional contact information that may be included in the search results. Alternatively, the search manager 92 may be configured to automatically replace or add information from the search results to the registry in association with the corresponding identifier without user involvement at the time of the receipt of the search results (e.g., automatically). In some cases, the user may have preferences or settings defined to enable or direct automatic contact information updating responsive to receipt of search results. However, in some embodiments, the user may define indicators of reliability or a threshold level of indicators of reliability which, if met, trigger automatic updating of contact information based on search results without user involvement beyond providing the initial settings. As an example, the user may define settings that trigger automatic updating of contact information if at least two other pieces of contact information for a particular contact are corroborated by corresponding search results. Thus, for example, if search results are returned for a contact with at least two matching parameters such as the same name and street address, the search results may be used to update remaining parameters such as telephone number, email address, and/or the like.

In some embodiments, the global search conducted by the search manager 92 may utilize resources associated with available NAB such as CAB. For example, the search manager 92 may be enabled to search for Personal Contact Cards (PCC) maintained by various contacts or entities. PCCs are typically stored as extensible markup language (XML) files in XML document management servers (XDMS) of respective different operators or service providers. Accordingly, the search manager 92 may be configured to conduct search operations in multiple PCC XDMSs worldwide based on XML Configuration Access Protocol (XCAP) and Xquery operations. Alternatively, non-CAB user contact searches may be conducted for non-CAB users using other search techniques and other available databases or information sources. To improve the search result, the search manager 92 may be configured to invoke multiple search queries to different network systems. For example, if a contact is initially defined only by a name and phone number, the search manager 92 may be configured to use SS7 system signaling or use SMS with a delivery report, or any other network signaling mechanisms to discover the service provider of the user. By knowing the service provider of the user, the search manager 92 may be enabled to efficiently and effectively perform the search.

As an alternative method to search a non-CAB user, the search manager 92 may be configured to invoke a specific SMS message to the service provider of the non-CAB user to request the contact information of the non-CAB user. The service provider of the non-CAB user may provide a response with complete contact information which may include the XUI.

In some embodiments, search results may include globally unique identifiers (e.g., addressed as UID in vCard). For example, the XUI (XCAP user ID) may be the globally unique ID for a contact or user from the CAB perspective. The globally unique ID may also be preserved for future use in some cases. In cases where search results do not include a globally unique ID, the search results may indicate that the corresponding contact is not a CAB user to enable notifying the user to track which contacts are users of CAB or another NAB within the user's address book, as already described above, as a notification service within CAB.

In an example embodiment, search results may be stored by the search manager 92 in a current user address book, a temporary address book, a separate XML document or other memory location (e.g., in the memory device 76). The search manager 92 may then provide copy, move, and/or delete operations to transfer selected data to the user address book as appropriate either immediately after being informed of search results or after some delay if the user is too busy to deal with reviewing search results or engaged in other activities. In some cases, where multiple potential matches are revealed in search results, the potential matches may all be presented to the user to enable the user to review and perhaps select the proper match. However, in cases where a large number of search results are received, only a predetermined limited number of matches (e.g., the top five or ten matches based on objective criteria) may be presented to the user at one time or at all.

In some embodiments, the user may direct the search manager 92 to periodically (or continuously) search for updated contact information for one or more contacts. Thus, for example, the user may provide the search manager 92 with a globally unique ID or other search criteria upon which repeated search operations may be conducted. As for example, from CAB notification service perspective, such search might only be performed for all the contacts that do not have XUI (globally unique identity), so that whenever a search result includes a valid XUI of a contact of an address book, the owner of the address book is notified that that particular contact became a CAB user, and the contact is removed from the list of contacts subject to future such search. Alternatively, all the contacts in an address book of CAB can be the subject of such search to know who are CAB users. In this case, it can be tracked if a contact becomes a non-CAB user from a CAB user (e.g., user initiated unsubscribing from the service, system initiated unsubscription due to lack of payment), and the owner of the address book can be notified accordingly. The user may also define a search interval or subscribe to repeated searching services that occur at a particular interval. Alternatively, the user may manually initiate searches at any time. In this case, the search can be limited to all PCC XDMSs.

Accordingly, embodiments of the present invention may provide a mechanism by which a user is enabled to initiate automatic searching for information that may be used to update the user's address book. Thus, for example, changes to contact information for various contacts, spelling errors in contact information, incomplete data, false information, and other potential shortcomings of an address book may be remedied in a way that may be relatively easy for users to employ.

Figure 4:
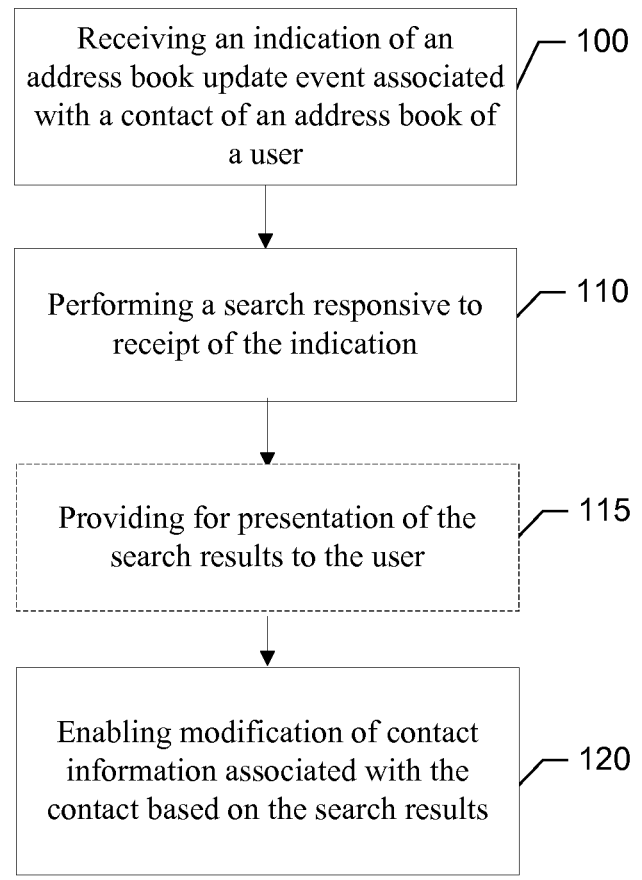
FIG. 4 is a block diagram according to another example method for providing a search tool for use in connection with address book management according to an example embodiment of the present invention.
Figure 5:
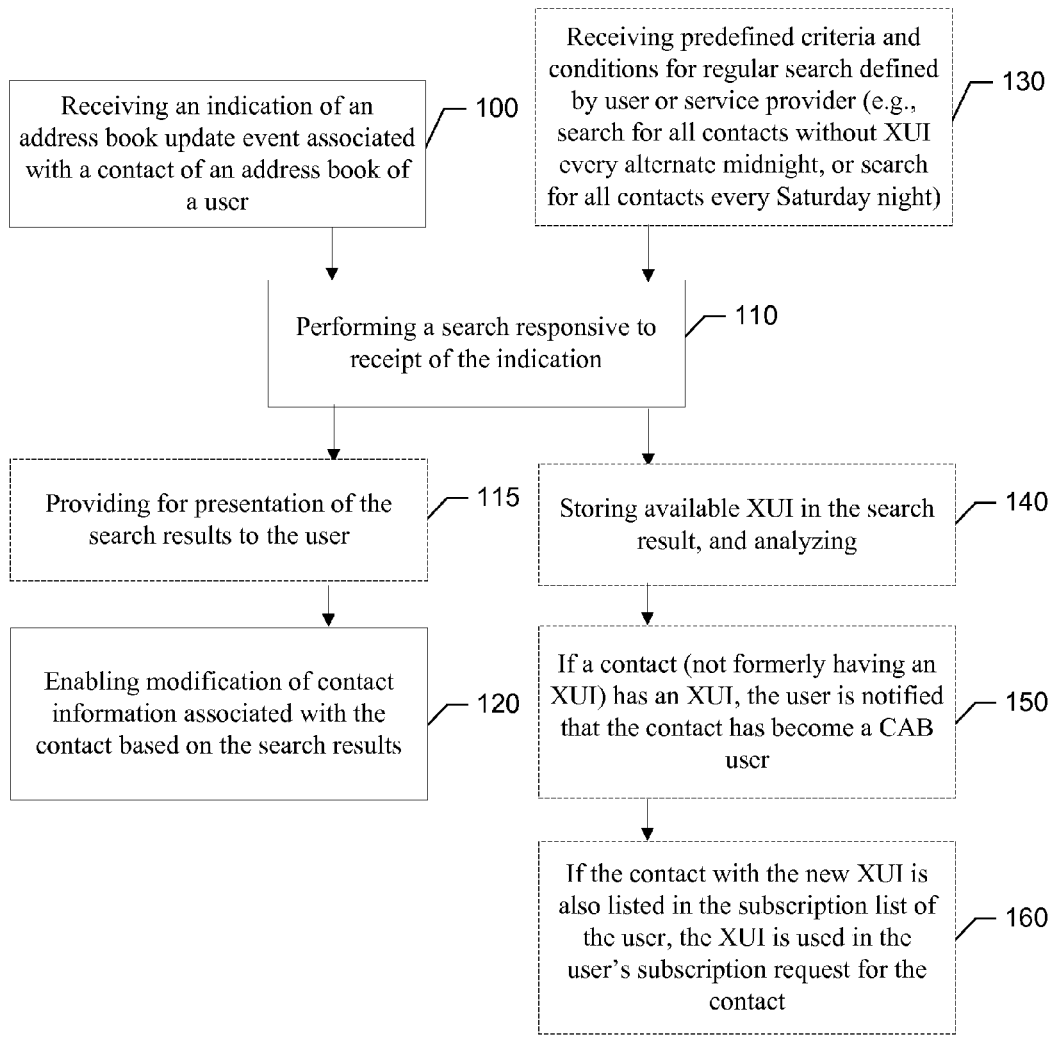
FIG. 5 is a block diagram illustrating the employment of an example embodiment in connection with notification and subscription services according to an example embodiment.

FIGS. 4 and 5 are flowcharts of a method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or network device and executed by a processor in the mobile terminal or network device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowcharts block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include receiving an indication (locally or remotely) of an address book update event associated with a contact of an address book of a user at operation 100 and performing a search responsive to receipt of the indication at operation 110. As such, the indication may trigger or cause the performance of the search thereby, in some embodiments, forming the direct cause or initiating event responsive to which the search occurs. The method may further include enabling modification of contact information associated with the contact based on the search results at operation 120.

In some embodiments, certain ones of the operations above may be modified or further amplified as described below. Moreover, in some embodiments additional optional operations may also be included (an example of which is shown in dashed lines in FIG. 4). It should be appreciated that each of the modifications, optional additions or amplifications below may be included with the operations above either alone or in combination with any others among the features described herein. In this regard, for example, the method may further include providing for presentation of the search results to the user at operation 115. In some embodiments, enabling modification of the contact information may include modifying the contact information based on a user selection of at least a portion of the search results. In some cases, enabling modification of the contact information may include modifying the contact information automatically based on predefined user reliability criteria. In an example embodiment, receiving an indication of the address book update event may include receiving an indication of an enhancing update. In an example embodiment, performing the search may include performing a search based on existing contact information. The search may be conducted for a globally unique ID associated with a NAB or CAB, for example. In some embodiments, the user may also be informed as to whether a contact is a user of a NAB or CAB. The received globally unique ID (XUI from CAB perspective) of a contact can also be used to subscribe for the contact (as mentioned above), to receive automatic update of contact and/or status information of the contact. Such subscription in CAB requires XUI of a contact, and any other information (e.g., name, phone number, address) may not be enough to make the subscription request.

FIG. 5 is a block diagram illustrating the employment of an example embodiment in connection with notification and subscription services according to an example embodiment. In this regard, as shown in FIG. 5, the search of operation 110 above may be used in connection with the provision of notification and subscription services that may be provided in parallel, in addition to, or instead of the other operations described above in connection with FIG. 4. In some embodiments, predefined criteria and conditions for a regular search defined by the user or a service provider may initially be provided at operation 130. After the search of operation 110, available XUI maybe stored in search results and analyzed at operation 140. If a contact that previously didn't have an XUI is found to have an XUI, the user may be notified that the contact has become a CAB user (and vice versa) at operation 150. If the contact with the new XUI is also listed in a subscription list of the user, the XUI may be used in the user's subscription request for the contact at operation 160.

In an example embodiment, an apparatus for performing the method of FIGS. 4 and 5 above may comprise a processor (e.g., the processor 70) configured to perform some or each of the operations (100-160) described above. The processor may, for example, be configured to perform the operations (100-160) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-160 may comprise, for example, the processor 70, the address book service 90, the search manager 92, and/or a device or circuit for executing instructions or executing an algorithm for processing information as described above.

An example of an apparatus according to an example embodiment may include at least one processor and at least one memory including computer program code. The at least one memory and the computer program code may be configured to, with the at least one processor, cause the apparatus to perform the operations 100-160 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 100-160 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving an indication of a user address book update event associated with a contact of an address book of a user;
   causing performance, via a processor, of a search of a database responsive to receipt of the indication, wherein the database searched is selected based, at least in part, on information related to the contact, wherein performing the search comprises performing a search for a globally unique identifier associated with a network-based address book (NAB) or a Converged Address Book (CAB);
   determining reliability of search results from the search of the database;
   enabling modification of contact information associated with the contact based on the search results in response to the search results being of a predetermined reliability, wherein the predetermined reliability comprises at least two elements of information in the search results corresponding to elements of information of the contact;
   causing storage of the globally unique identifier of the contact as a search result; and
   providing for notification of the user in an instance in which the contact had not previously been associated with the globally unique identifier associated with the NAB or the CAB.

2. The method of claim 1, wherein enabling modification of the contact information comprises modifying the contact information based on a user selection of at least a portion of the search results.

3. The method of claim 1, wherein performing the search comprises performing a search based on existing contact information.

4. The method of claim 1, further comprising informing the user as to whether a contact is a user of the NAB or the CAB.

5. The method of claim 1, further comprising receiving predefined criteria and conditions for a regular search defined by the user or a service provider.

6. The method of claim 1, wherein the database to be searched is selected based on at least one of a phone number country code of the contact, a phone number area code of the contact, or a domain name of an email address of the contact.

7. The method of claim 1, wherein the database to be searched is selected based on the presence of a globally unique identifier of the contact.

8. The method of claim 1, wherein the predetermined reliability comprises user-defined indicators of reliability.

9. The method of claim 8, wherein the user-defined indicators of reliability comprise at least one threshold, and wherein enabling modification of contact information associated with the contact based on the search results is performed in response to the reliability of the search results satisfying the at least one threshold.

10. The method of claim 1, wherein the at least two elements comprise at least two elements selected from the group of: a contact name; a contact address; a contact phone number; a contact email address; or a contact identifier.

11. The method of claim 1, wherein modification of contact information associated with the contact based on the search results is not performed in response to the results being below a predetermined reliability, wherein fewer than two elements of information in the search results correspond to elements of information of the contact.

12. An apparatus comprising at least one processor and at least one memory including computer program code, the at least one memory and the computer program code configured to, with the at least one processor, cause the apparatus at least to:
receive an indication of a user address book update event associated with a contact of an address book of a user;
cause performance of a search of a database responsive to receipt of the indication, wherein the database searched is selected based, at least in part, on information related to the contact, wherein causing performance of the search comprises causing performance of a search for a globally unique identifier associated with a network-based address book (NAB) or a Converged Address Book (CAB);
determine reliability of search results from the search of the database;
enable modification of contact information associated with the contact based on the search results in response to the search results being of a predetermined reliability, wherein the predetermined reliability comprises at least two elements of information in the search results corresponding to elements of information of the contact;
cause storage of the globally unique identifier of the contact as a search result; and
provide notification of the user in an instance in which the contact had not previously been associated with the globally unique identifier associated with the NAB or the CAB.

13. The apparatus of claim 12, wherein the at least one memory and computer program code are further configured to, with the at least one processor, cause the apparatus to provide for presentation of the search results to the user.

14. The apparatus of claim 12, wherein the at least one memory and computer program code are configured to, with the at least one processor, cause the apparatus to enable modification of the contact information by modifying the contact information based on a user selection of at least a portion of the search results.

15. The apparatus of claim 12, wherein the at least one memory and computer program code are configured to, with the at least one processor, cause the apparatus to receive an indication of the address book update event by receiving an indication of an enhancing update.

16. The apparatus of claim 12, wherein the at least one memory and computer program code are configured to, with the at least one processor, cause the apparatus to perform the search by performing a search based on existing contact information.

17. The apparatus of claim 12, wherein the at least one memory and computer program code are configured to, with the at least one processor, cause the apparatus to inform the user as to whether a contact is a user of the NAB or the CAB.

18. The apparatus of claim 12, wherein the at least one memory and computer program code are configured to, with the at least one processor, cause the apparatus to receive predefined criteria and conditions for a regular search defined by the user or a service provider.

19. A computer program product comprising at least one non-transitory computer-readable storage medium having computer-executable program code instructions stored therein, the computer-executable program code instructions comprising program code instructions to:
receive an indication of a user address book update event associated with a contact of an address book of a user;
cause performance of a search of a database responsive to receipt of the indication, wherein the database searched is selected based, at least in part, on information related to the contact, wherein causing performance of the search comprises causing performance of a search for a globally unique identifier associated with a network-based address book (NAB) or a Converged Address Book (CAB);
determine reliability of search results from the search of the database;
enable modification of contact information associated with the contact based on the search results in response to the search results being of a predetermined reliability, wherein the predetermined reliability comprises at least two elements of information in the search results corresponding to elements of information of the contact;
cause storage of the globally unique identifier of the contact as a search result; and
provide for notification of the user in an instance in which the contact had not previously been associated with the globally unique identifier associated with the NAB or the CAB.

* * * * *